United States Patent Office

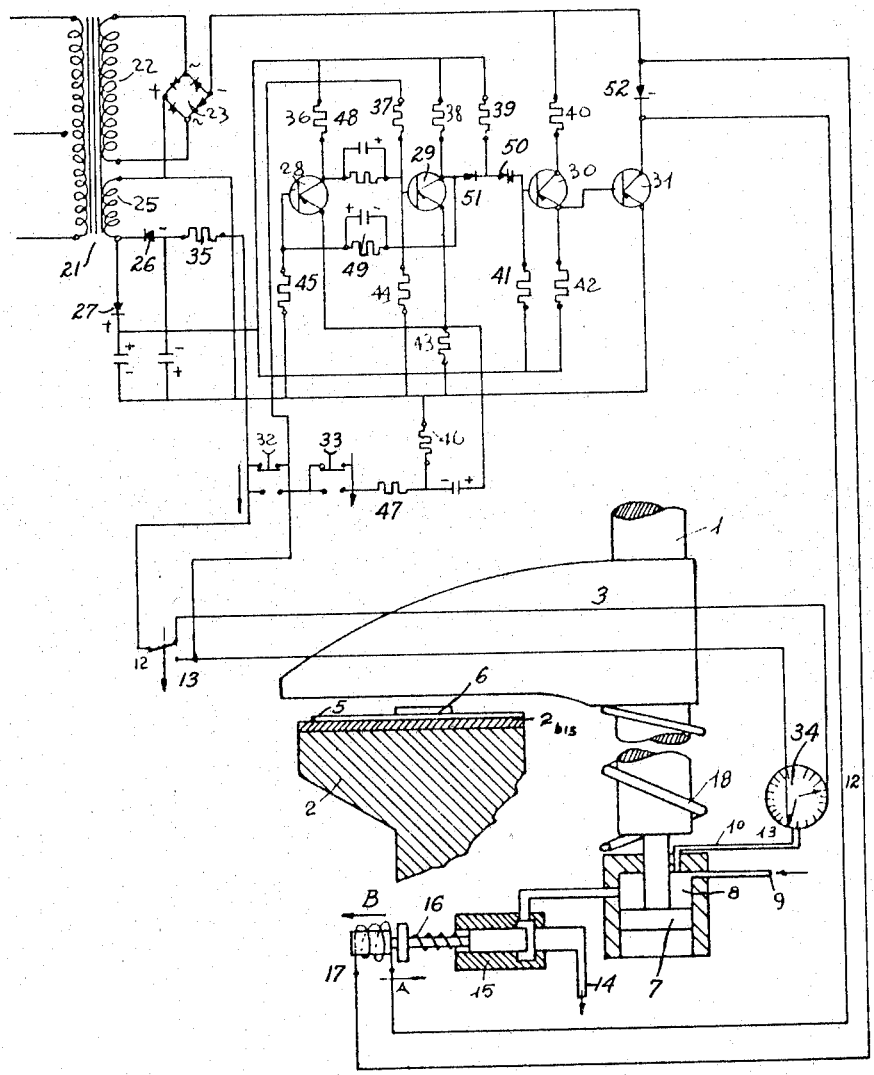

3,289,515
Patented Dec. 6, 1966

3,289,515
MACHINE FOR SHEARING OR PUNCHING OF SHEER MATERIALS
Artorige Chiesa, Via F. lli Cagnoni 19, Vigevano, Italy
Filed July 15, 1964, Ser. No. 382,815
Claims priority, application Italy, Oct. 12, 1963, A/39,945; Dec. 6, 1963, A/41,716
7 Claims. (Cl. 83—533)

As is well known in machines for the shearing or punching different sheet materials, such as plastics, skins, fabrics, cardboard, leather in various thicknesses, the shearing or punching operation is carried out by a table that is moved with respect to a fixed table, on which the material to be sheared or punched is supported, a shearing or punching tool being interposed between said two tables. In such machines, the pressure required for performing the shearing or punching operation is provided by the action exerted by a fluid on a piston which is slidingly fitted in a cylinder, said piston being rigidly connected with the movable table. The pressure fluid, as required for such a purpose, is delivered by a suitable pump.

Also known are devices by which the stroke of the movable table is stopped, after the shearing or punching operation has been performed by the tool, and upon contact of the tool with the fixed table.

One of the devices that is most widely used for the above purpose is based on the closing of an electric circuit, said circuit comprising the movable table-tool-fixed table, whereby the latter must be necessarily made of a current conductive material. In such a case, the closing of the circuit causes stoppage of the stroke of the movable table, whereafter said movable table is returned to its original position by the action of a return spring. The stoppage of the movable plate occurs when the steel tool, after having performed the shearing or punching operation, comes into contact with the fixed metal table and thereby closes the circuit.

Another known device, is operative in accordance with the elastic deformation which the column of the machine undergoes when the tool comes into contact with the fixed table. By multiplying such small deformations through a mechanical lever system, an electric contact, fitted on the column, is closed, thus closing a separate circuit, whereby the stroke of the movable table is stopped, and said table is returned to its starting position.

Manual adjusting means, consisting of end-stroke stops, are also known. A drawback of such means is that they require a re-adjustment each time the tools are changed.

The drawbacks inherently encountered in the use of the above-specified machines, such as, the necessity of a thorough contact between tool and fixed table (as required for the closing of an electric circuit) results in quick wear of both tool and table, whereas the elastic, but uncontrolled deformations of the column, may result, after a period of time, in a fatigue failure. Such drawbacks are wholly obviated by this invention.

The invention provides means for controlling the overpressure which is generated in the fluid in the cylinder, when the tool comes into contact with the fixed table, after the shearing or punching operation, in order to limit such overpressure to a magnitude sufficient to ensure an efficient shearing or punching of sheet material, and to prevent such magnitude from being unnecessarily exceeded. Such control is attained by the use of a pressure controller which is connected in the pressure fluid circuit, in a location suitable for an accurate indication of the operating pressures and of overpressures.

By such arrangement, associated with a particular electronic circuit, the movable table can be stopped—and then returned in its starting position by the action of a return spring—at pre-selected, and accurately adjustable values of overpressure.

The overpressure values at which the movable table must be stopped can be adjusted on a suitable scale, and are selected according to such factors as the hardness and thickness of the sheet material, as well as to the type of tool which is being utilized, as well as the hardness of the material of the fixed table.

The inventors have utilized an electronic circuit to effect instantaneous control of the hydraulic pressure circuit. In this regard it is to be understood that the magnitude of operating pressures and the speed at which the effect of such pressures are exerted on the structure of the machine at the very instant in which the tool comes into contact with the fixed table is rather large. If the control signal is transmitted with a time log by the pressure controller, it has been ascertained that this results in the generation of large forces. For example, the transmission of a control signal through a conventional electric circuit takes sufficient time though amounting only to a few hundredths of a second for each relay (operating and re-setting time), to result in a hard impact, and all the consequences thereof.

It is thereby a feature of the invention to detect the variation of hydraulic pressure developed when the tool penetrates the treated material and contacts the fixed table to instantly relieve the pressure and thereby prevent generation of large forces between the tool and the tables.

The advantages obtained by the invention can be summarized as follows:

(a) Absolute evenness of the punching or the shearing operation, since said operation is stopped only after a given pressure has been attained, thereby ensuring a positive limit to the forces which can be developed.

(b) The wear of tools and tables is minimized, since by the invention the cause of such wear—and not the effect—is removed.

(c) It is possible to utilize any type of wearing plate, of whatever material (even non-conductive), having a hardness suitable for the particular use of the machine. Consequently, the insulation of the fixed table is no longer needed, and the use of grounding circuits can be dispensed with.

(d) There is positive prevention of the generation of great stresses which are caused by the use of electric delaying devices which while allowing an accurate adjustment of the shearing operation, always result, however, in overpressures with uncontrolled and adverse effects.

Moreover, the following added advantages can be obtained by the use of an electronic circuit:

(e) Elimination of moving masses in the circuit, with consequent prevention of wear due to friction, and elimination of any inertia due to displacement, which would cause a delay in the transmission of control signals.

(f) Absolute elimination of arcings which, together with the fact that control signals of only micro-currents are utilized for the transmission of controls, ensures an unlimited life of all circuits.

(g) By the use of an electronic circuit, all components can be fitted on a printed circuit panel of very small size, and bayonet fitted, whereby it can be easily withdrawn and replaced without the need of a skilled electrician.

(h) By the use of a printed electronic circuit, no damage can be caused by moisture, dirt or vibrations, thus ensuring a practically unlimited life of the device.

(i) By the hereinafter described electronic circuit, a speed so high has been attained in the transmission and forwarding of control pulses that recourse is made to an interlocking control, since the possibility exists that the operator does not release the control pushbuttons and thereby does not break the circuit in due time (owing to the very quick return of the movable table, and man's normal reflexes) and thus unwillingly causes a repetition of the stroke.

In other words, a pre-set safety device is provided in said circuit. Such device does not permit repetition of the stroke, unless the circuit is first broken, and again closed by the operator, by acting on the control pushbuttons.

The apparatus by which the invention can be carried into practice is shown in the attached sole figure of the drawing wherein there is diagrammatically illustrated a cross-section of the machine, with a fluid circuit, a pressure controller, an electrovalve and control along with an electronic circuit, by which the movable table is stopped.

In the drawing there is shown a movable column 1 of the machine which is rigidly connected with the piston 7, for being driven thereby. The piston 7 is slidingly fitted in the cylinder 8. The column 1 carries the movable table 3, whereon control pushbuttons 32 and 33 are fitted. On the column is a return spring 18 which acts on the table 3.

A machine base 2 supports the fixed table, wherein the wearing plate 2-bis is embodied. The sheet material 5 to be sheared or punched by means of tool 6, is placed on said wearing plate. The shearing operation is carried out by a downward stroke of movable table 3, driven by the fluid delivered to the cylinder-piston unit 8. The pressure as required for shearing or punching the sheet material 5 is exerted on the tool 6 by the movable table 3. The cylinder 8 is fed with the pressure fluid (e.g. hydraulic oil) by a pump, through the piping 9. Said fluid, when fed to cylinder 8, will exert on the piston 7 a pressure respectively having a higher value, when the discharge pipe 14 is kept closed by the electrovalve 15, or a lower value when the latter valve is open, at which time the fluid is returned into the main tank (not shown), wherefrom it is recirculated by the pump. Said electrovalve 15 is in closed position (when displaced in the direction of the arrow A in the drawing) by the action of solenoid 17, while the said electrovalve is in open position (when displaced in the direction as shown by the arrow B in the drawing) by the action of the return spring 16 when the solenoid is not energized. A fluid conduit extends from the cylinder 8 to the cylinder or casing of the electrovalve for the passage of pressure fluid. The latter conduit opens into a port in the casing which is in communication with the exhaust 14. The valve member projects into the port in varying amounts in the open and closed positions to control the flow of pressure fluid and thereby control the build-up of pressure in the cylinder 8. The cylinder 8 is connected, by the pipe 10, with a pressure controller 34, which covers an adjustable range of pressures by the opening and closing of the electric contacts 12 and 13. The pressure controller 34 is thus subjected to the pressure in cylinder 8 and upon the development of a pressure corresponding to that preset by controller 34 causes closing of contacts 12 and 13.

Two low voltages are tapped from the secondary winding of network transformer 21. A 36 v. D.C. is fed by the secondary section 22 of transformer 21, along with the diode rectifier set 23, to solenoid 17 of the electrovalve 15. The other section 25 of the secondary winding of transformer 21 is designed to feed 24 v. D.C., respectively through the diodes 26 and 27, to an interlock circuit of transistors 28, 29, 30, 31, and to an auxiliary control circuit, comprised of pushbuttons 32, 33, and of the contacts 12 and 13 of the pressure controller 34.

The resistances 35, 36, 37, 38, 39, 40, 41, 42, 43, 44, 45, 46 are respectively inserted, for ensuring that a voltage, having the exact value required, is fed to transistors 28, 29, 30, 31.

48 and 49 are two parallel connected oscillating circuits (or flip-flops), by which current to the transistors is interrupted, at the very instant in which a voltage is applied to the whole circuit.

50 is a Zener voltage stabilizer. 51 is a current vacuum tube rectifier. 52 is a vacuum tube rectifier by which the reversed overcurrent, as caused by the opening and closing of the electrovalve 15, is switched off. When a voltage is applied to the whole circuit, the transistors 30 and 31 become non-conductive, owing to the forced conductivity of transistor 29, which is caused by the rest position of pushbuttons 32–33. Consequently, the solenoid 17 of the electrovalve 15 is non-energized, and no downstroke of the movable table is caused by the hydraulic circuit.

To start the machine, both pushbuttons 32, 33 are depressed. Thus, the condition of forced conductivity of transistor 29 is discontinued. At the same time, a control pulse is sent, whereby the transistor 28 is made conductive, the transistor 29 is made non-conductive, and the transistors 30 and 31 are made conductive, whereby the electrovalve 15 is operated. Consequently, the downstroke of the movable table is effected. At the end of said stroke, an overpressure is built up in the hydraulic circuit, which results in an intervention of the pressure controller 34.

The closing of contacts 12 and 13 of pressure controller 34 results in the transistor 29 becoming conductive again, while the transistors 30 and 31 become non-conductive, and the electrovalve 15 is de-energized, whereby the movable plate is instantaneously stopped, and then returned to its starting position under the action of its return spring 18. Then above operation can be repeated after having opened, and again closed, the contacts of pushbuttons 32 and 33.

What we claim is:

1. In combination: a machine including an upper movable table and a fixed lower table on which is adapted to be placed a blank and a tool surmounting the blank; means engaged with the movable table to displace the same with respect to the fixed table, the latter means including hydraulically actuated piston and cylinder means for lowering the movable table towards the fixed table, means for supplying hydraulic pressure fluid to said piston and cylinder means to operate the same, said upper table being lowered to contact the tool and force the same through the blank into contact with the lower table at which time the pressure of the hydraulic fluid in the piston and cylinder means instantaneously increases; and means connected to said piston and cylinder means to instantaneously relieve the pressure of the fluid therein and thereby terminate displacement of the movable table upon the generation of the instantaneous pressure; said means for relieving the pressure of the fluid comprising first means connected to the piston and cylinder means and responsive to the pressure of the fluid developed therein, electronic circuit means connected to said first means for generating an electrical impulse instantaneous with the sensing by said first means of the instantaneous fluid pressure increase, and valve means connected to said electronic circuit means and to the piston and cylinder means to regulate outflow of pressure fluid from the latter and arrest movement of the upper table upon the generation of an electrical signal by said electronic circuit means, said electronic circuit means comprising a first transistor connected to the first means which is responsive to the pressure of the fluid, control means for the conductivity of said transistor, a second transistor placed in parallel to the first transistor, two flip-flop circuits to selectively make the first and second transistors periodically conductive and non-conductive, dependent on the state of said first means, a third and fourth transistor to control the energization of said valve means, said latter two transistors being respectively controlled by the conductive relationship of the first two transistors to constitute a block circuit for the movable table of the press to stop said movable table after the penetration of the blank by the tool and thereby avoid further displacement of said movable table downwards which is possible only after subsequent lifting of the upper movable table to the starting position thereof.

2. In the combination as claimed in claim 1 wherein said valve means comprises an electrovalve having first and second positions, said electrovalve in said first position enabling development of pressure of the fluid in the piston and cylinder means to exert force on the upper table whereas in said second position permitting the outflow of fluid from the piston and cylinder means to relieve force on the upper table.

3. In the combination as claimed in claim 2 wherein said valve means comprises means defining an outlet passage for fluid from the piston and cylinder means, said electrovalve in the first position at least partially blocking the outlet passageway, while in said second position opening the outlet passageway.

4. In the combination as claimed in claim 3 wherein said valve means comprises a casing in which the electrovalve is slidably supported, said casing having an exhaust opening, said outlet passageway from the piston and cylinder means opening into the casing, said casing being provided with a port establishing communication between the exhaust opening and the opening of the outlet passageway into the casing, said electrovalve being in said port in said first position to impede flow therein to enable development of pressure of the fluid in the piston and cylinder means.

5. In the combination as claimed in claim 1 comprising spring means acting on said movable upper table urging the same towards an original upper position thereof, said upper table being displaced towards the fixed table against the action of said spring means.

6. In the combination as claimed in claim 1 wherein said electronic circuit means comprises push buttons for initially closing the circuit means, said circuit means controlling said valve means to close the same when the circuit means is closed and thereby develop pressure of the fluid in the piston and cylinder means whereby the upper table is lowered.

7. In the combination as claimed in claim 6 wherein said first means comprises a pressure controller device having contacts placed in said electronic circuit means for opening the latter when the controller device senses the instantaneous increase of pressure of the hydraulic fluid in the piston and cylinder means.

References Cited by the Examiner

UNITED STATES PATENTS

| 2,735,405 | 2/1956 | Hipple | 91—356 X |
| 3,172,324 | 3/1965 | Hitchcock | 83—538 |

FOREIGN PATENTS

| 523,600 | 7/1940 | Great Britain. |

WILLIAM W. DYER, Jr., *Primary Examiner.*

L. B. TAYLOR, *Assistant Examiner.*